(12) United States Patent
Ohkawa

(10) Patent No.: US 6,214,223 B1
(45) Date of Patent: Apr. 10, 2001

(54) TOROIDAL PLASMA MASS FILTER

(75) Inventor: Tihiro Ohkawa, La Jolla, CA (US)

(73) Assignee: Archimedes Technology Group, Inc., San Diego, CA (US)

( * ) Notice: Subject to any disclaimer, the term of this patent is extended or adjusted under 35 U.S.C. 154(b) by 0 days.

(21) Appl. No.: 09/354,358

(22) Filed: Jul. 14, 1999

(51) Int. Cl.[7] .............................. B03C 1/00; B01D 21/26
(52) U.S. Cl. .................. 210/222; 210/243; 210/304; 210/512.1; 55/459.1; 96/1; 96/2; 96/3; 209/227; 209/772
(58) Field of Search .................... 210/222, 243, 210/512.1, 695, 748, 304; 96/1, 2, 3; 204/554, 660; 209/227, 722; 55/459.1

(56) References Cited

U.S. PATENT DOCUMENTS

| | | | |
|---|---|---|---|
| 3,722,677 | * 3/1973 | Lehnert | 209/227 |
| 5,039,312 | 8/1991 | Hollis, Jr, et al. | |
| 5,350,454 | 9/1994 | Ohkawa | |
| 5,681,434 | 10/1997 | Eastlund | |
| 5,868,909 | 2/1999 | Eastlund | |

FOREIGN PATENT DOCUMENTS

WO 97/34685   9/1999   (WO) .

OTHER PUBLICATIONS

Anders, André, Interaction of Vacuum–Arc–Generated Macroparticles with a Liquid Surface; Lawrence Berkeley National Laboratory, University of California, Berkeley, California 94720.

Bittencourt, J.A. and Ludwig, G.O.; Steady State Behavior of Rotating Plasmas in a Vacuum–Arc Centrifuge; *Plasma Physics and Controlled Fusion,* vol. 29, No. 5, pp. 601–620; 1987 Great Britain.

Bonnevier, Björn; Experimental Evidence of Element and Isotope Separtion in a Rotating Plasma; *Plasma Physics,* vol. 13, pp. 763–774; Northern Ireland, 1971.

Dallaqua, R.S., et al, Experiments with Background Gas in a Vacuum Arc Centrifuge, *IEEE Transactions on Plasma Science,* vol. 24, No., Apr., 1996.

Dallaqua, R.S., et al, Langmuir Probe Measurements in a Vacuum Arc Plasma Centrifuge, *IEEE Transactions on Plasma Science,* vol. 26, No. 3, Jun. 1998.

Dallaqua, R.S., et al, Radial Magnetic Field in Vacuum Arc Centrifuges, *J. Phys. D: Appl. Phys.* 30 (1997), 2585–2590.

(List continued on next page.)

*Primary Examiner*—David A. Reifsnyder
(74) *Attorney, Agent, or Firm*—Nydegger & Associates

(57) ABSTRACT

A toroidal shaped plasma mass filter for separating heavy mass ions ($M_2$) from light mass ions ($M_1$) includes a platform having an annular shaped surface with a circular axis of rotation located midway between the inner and outer circumferences of the platform. An arched wall covers the platform to create a plasma chamber with the wall at least at a distance "a" from the axis of rotation. A plasma source is mounted on the platform in the chamber between the axis of rotation and the wall to generate a multi-species containing light mass particles ($M_1$) and heavy mass particles ($M_2$). In the chamber, the toroidal component, $B_\phi$, of a helical magnetic field, B, is crossed with an electrical field, $E_r$, having a positive potential $V_{ctr}$ along the axis of rotation. The crossed magnetic and electric fields thus rotate the multi-species plasma around the axis of rotation, and thereby separate the light mass particles ($M_1$) from the heavy mass particles ($M_2$) in accordance with the expression $M_c = ea^2 B_\phi^2 / 8 V_{ctr}$. In this expression $M_c$ is selected as a cut-off mass that is greater than $M_1$ and less than $M_2$ ($M_1 < M_c < M_2$). In operation the heavy mass particles ($M_2$) are collected on the chamber wall and the light mass particles ($M_1$) are trapped by a collector on the platform.

20 Claims, 2 Drawing Sheets

OTHER PUBLICATIONS

Evans, P.J.; Paoloni, F. J.; Noorman, J.T. and Whichello, J.V; Measurements of Mass Separation in a Vacuum–Arc Centrifuge; *J. Appl. Phys.,* vol. 66, No. 1, pp. 115–118; Jul. 1, 1989.

Kim, C.; Jensen, R. V.; and Krishnan, M.; Equilibria of a Ridigly Rotating, Fully Ionized Plasma Column; *J. Appl. Phys.;* vol. 61, No. 9; pp. 4689–4690; May, 1987.

Krishnan, M.; Centrifugal Isotope Separation in Zirconium Plasmas; *Phys. Fluids* 26 (9); pp. 2676–2681; Sep., 1983.

Krishnan, Mahadevan and Rasad, Rahul R.; Parametric Analysis of Isotope Enrichment in a Vacuum–Arc Centrifuge; *J. Appl. Phys.* 57 (11); pp. 4973–4980, Jun. 1, 1985.

Geva, M.; Krishnan, M. and Hirshfield, J. L. ; Element and Isotope Separation in a Vacuum–Arc Centrifuge; *J. Appl. Phys.* 56 (5); pp. 1398–1413; Sep. 1, 1984.

Stable Isotope Production, Nuclear Tech: Global Accomplishments and Opportunities, p. 531.

Ohkawa, T. et al., Plasma Confinement in a Toroidal Quadrupole, *Physics of Fluids,* 12, 1926 (1969).

Ohkawa, T. et al., Plasma Confinement in D.C. Octopole, *Phys Rev. Letters* 24, 95 (1970).

Prasad, Rahul R.; Krishnan, Mahadevan; Theoretical and Experimental Study of Rotation in a Vacuum–Arc Centrifuge; *J. Appl. Phys.,* vol. 61, No. 1; pp. 113–119; Jan. 1, 1987.

Prasad, Rahul R., and Krishnan, Mahadevan; Article from *J. Appl. Phys.* 61 (9); pp. 4464–4470; *American Institute of Physics;* May 1, 1987.

Simpson, S.W.; Dallaqua, R. S.; and Del Bosco, E; Accelertaion Mechanism in Vacuum Arc Centrifuges; *J. Phys.D.: Appl. Phys.* 29; pp. 1040–1046; UK 1996.

\* cited by examiner

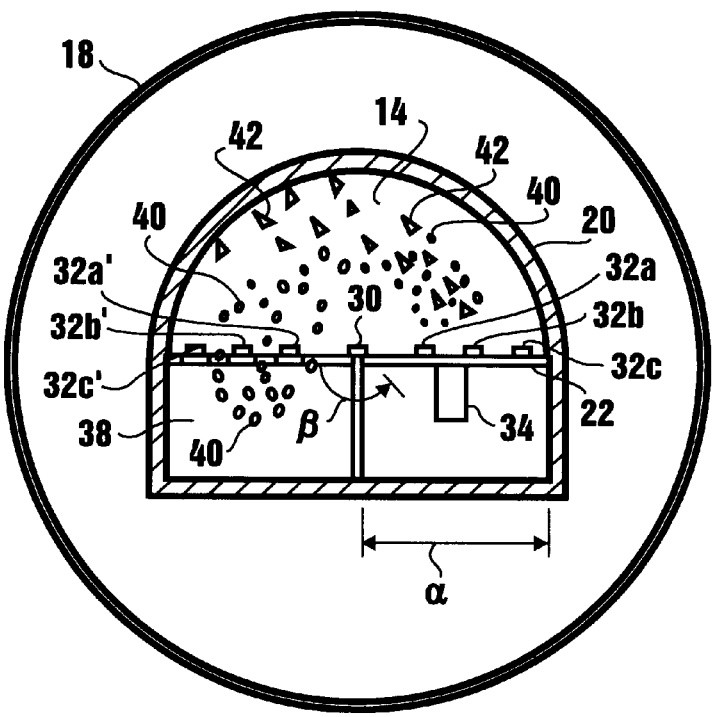
Figure 4
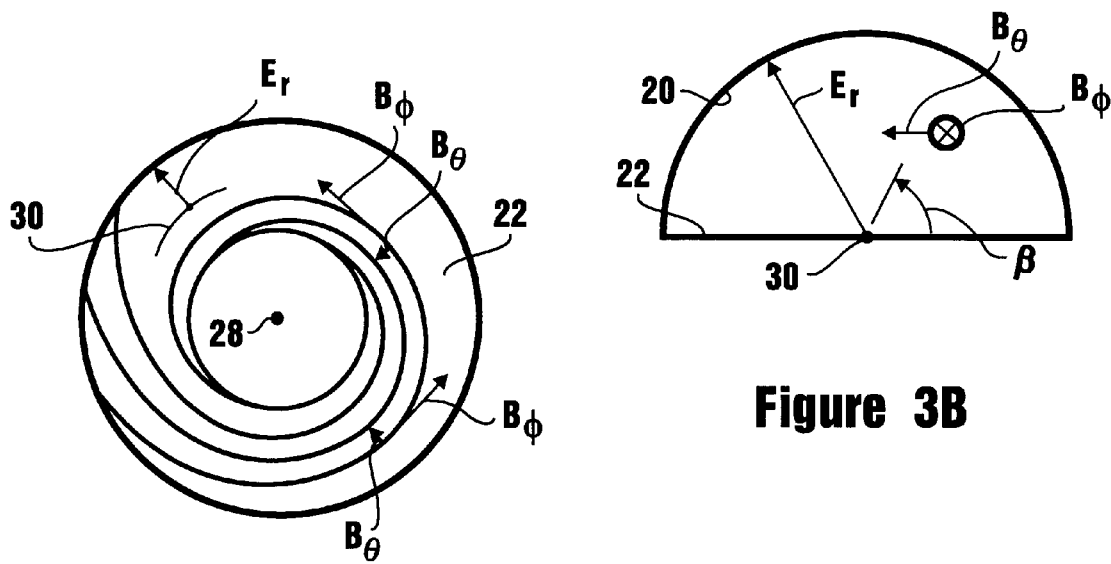
Figure 3A
Figure 3B

TOROIDAL PLASMA MASS FILTER

FIELD OF THE INVENTION

The present invention pertains generally to plasma filters. More particularly, the present invention pertains to filters which act on a multi-species plasma containing both light mass particles ($M_1$) and heavy mass particles ($M_2$) for the purpose of separating the light mass particles ($M_1$) from the heavy mass particles ($M_2$). The present invention is particularly, but not exclusively, useful as a plasma mass filter having a toroidal or annular shaped plasma chamber.

BACKGROUND OF THE INVENTION

The general principles of operation for a plasma centrifuge are well known and well understood. In short, a plasma centrifuge generates forces on charged particles which will cause the particles to separate from each other according to their mass. More specifically, a plasma centrifuge relies on the effect crossed electric and magnetic fields have on charged particles. As is known, crossed electric and magnetic fields will cause charged particles in a plasma to move through the centrifuge on respective helical paths around a centrally oriented longitudinal axis. As the charged particles transit the centrifuge under the influence of these crossed electric and magnetic fields they are, of course, subject to various forces. Specifically, in the radial direction, i.e. a direction perpendicular to the axis of particle rotation in the centrifuge, these forces are: 1) a centrifugal force, $F_c$, which is caused by the motion of the particle; 2) an electric force, $F_E$, which is exerted on the particle by the electric field, $E_r$; and 3) a magnetic force, $F_B$, which is exerted on the particle by the magnetic field, $B_z$. Mathematically, each of these forces are respectively expressed as:

$F_c = Mr\omega^2$;

$F_E = eE_r$; and $F_B = er\omega B_z$.

Where:

M is the mass of the particle;

r is the distance of the particle from its axis of rotation;

$\omega$ is the angular frequency of the particle;

e is the electric charge of the particle;

E is the electric field strength; and $B_z$ is the magnetic flux density of the field.

In a plasma centrifuge, it is general practice that the electric field will be directed radially inward. Stated differently, there is an increase in positive voltage with increased distance from the axis of rotation in the centrifuge. Under these conditions, the electric force $F_E$ will oppose the centrifugal force $F_C$ acting on the particle, and depending on the direction of rotation, the magnetic force either opposes or aids the outward centrifugal force. Accordingly, an equilibrium condition in a radial direction of the centrifuge can be expressed as:

$\Sigma F_r = 0$ (positive direction radially outward)

$F_c - F_E - F_B = 0$ $Mr\omega^2 - eE_r - er\omega B_z = 0$ (Eq. 1)

It is noted that Eq. 1 has two real solutions, one positive and one negative, namely:

$\omega = \Omega/2(1 \pm \sqrt{1 + 4E_r/(rB_z\Omega)})$ where $\Omega = eB_z/M$.

For a plasma centrifuge, the intent is to seek an equilibrium to create conditions in the centrifuge which allow the centrifugal forces, $F_c$, to separate the particles from each other according to their mass. This happens because the centrifugal forces differ from particle to particle, according to the mass (M) of the particular particle. Thus, particles of heavier mass experience greater $F_c$ and move more toward the outside edge of the centrifuge than do the lighter mass particles which experience smaller centrifugal forces. The result is a distribution of lighter to heavier particles in a direction outward from the mutual axis of rotation. As is well known, however, the separation achieved in a plasma centrifuge is limited.

As an alternative to the plasma centrifuge, an apparatus which is structurally similar but which is operationally and functionally very dissimilar has been more recently developed. This alternative apparatus is referred to herein as a plasma mass filter and is fully disclosed in co-pending U.S. application Ser. No. 09/192,945 for an invention of Ohkawa entitled "Plasma Mass Filter" which is assigned to the same assignee as the present invention. The fundamental difference between a plasma centrifuge and a plasma mass filter is that, unlike a plasma centrifuge which relies on collisions between the various ions as they are rotated in the plasma chamber, a plasma mass filter relies on the ability of the ions to orbit inside the plasma chamber. Thus, the physics that are involved are different.

As indicated above in connection with Eq. 1, a force balance can be achieved for all conditions when the electric field E is chosen to confine ions, and ions exhibit confined orbits. In a plasma filter, however, unlike a centrifuge, the electric field is chosen with the opposite sign to extract ions. The result is that ions of mass greater than a cut-off value, $M_c$, are on unconfined orbits. The cut-off mass, $M_c$, can be selected by adjusting the strength of the electric and magnetic fields. The basic features of the plasma filter can be described using the Hamiltonian formalism.

The total energy (potential plus kinetic) is a constant of the motion and is expressed by the Hamiltonian operator:

$H = e\Phi + (P_R^2 + P_z^2)/(2M) + (P_\theta - e\Psi)^2/(2Mr^2)$ where $P_R = MV_R$, $P_\theta = MrV_\theta + e\Psi$, and $P_z = MV_z$ are the respective components of the momentum and $e\Phi$ is the potential energy. $\Psi = r^2 B_z/2$ is related to the magnetic flux function and $\Phi = \alpha\Psi + V_{ctr}$ is the electric potential. $E = -\nabla\Phi$ is the electric field which is chosen to be greater than zero for the filter case of interest. We can rewrite the Hamiltonian:

$H = e\alpha r^2 B_z/2 + eV_{ctr} + (P_R^2 + P_z^2)/(2M) + (P_\theta - er^2 B_z/2)^2/(2Mr^2)$ We assume that the parameters are not changing along the z axis, so both $P_z$ and $P_\theta$ are constants of the motion. Expanding and regrouping to put all of the constant terms on the left hand side gives:

$H - eV_{ctr} - P_z^2/(2M) + (P_\theta\Omega/2 = P_R^2/(2M) + (P_\theta^2/(2Mr^2) + (M\Omega r^2/2)(\Omega/4 + \alpha)$ where $\Omega = eB/M$.

The last term is proportional to $r^2$, so if $\Omega/4 + \alpha < 0$ then, since the second term decreases as $1/r^2$, $P_R^2$ must increase to keep the left-hand side constant as the particle moves out in radius. This leads to unconfined orbits for masses greater than the cut-off mass given by:

$M_c = e(B_z a)^2/(8V_{ctr})$ where we used:

$\alpha = (\Phi - V_{ctr})/\Psi = -2V_{ctr}/(a^2 B_z)$ (Eq. 2)

and where a is the radius of the chamber.

So, for example, normalizing to the proton mass, $M_p$, we can rewrite Eq. 2 to give the voltage required to put higher masses on loss orbits:

$$V_{ctr} > 1.2 \times 10^{-1}(a(m)B(\text{gauss}))^2/(M_C/M_P)$$

Hence, a device radius of 1 m, a cutoff mass ratio of 100, and a magnetic field of 200 gauss require a voltage of 48 volts.

The same result for the cut-off mass can be obtained by looking at the simple force balance equation given by:

$\Sigma F_r = 0$ (positive direction radially outward)

$F_C + F_E + F_B = 0$ $$Mr\omega^2 + eEr - er\omega B_z = 0 \quad \text{(Eq. 3)}$$

which differs from Eq. 1 only by the sign of the electric field and has the solutions:

$$\omega = \Omega/2(1 \pm \sqrt{1 - 4E/(rB_z\Omega)})$$

so if $4E/rB_z\Omega > 1$ then $\omega$ has imaginary roots and the force balance cannot be achieved. For a filter device with a cylinder radius "a", a centralvoltage, $V_{ctr}$, and zero voltage on the wall, the same expression for the cut-off mass is found to be:

$$M_C = ea^2B_Z^2/8V_{ctr} \quad \text{(Eq. 4)}$$

When the mass M of a charged particle is greater than the threshold value ($M > M_c$), the particle will continue to move radially outwardly until it strikes the wall, whereas the lighter mass particles will be contained. The higher mass particles can also be recovered from the walls using various approaches.

It is important to note that for a given device the value for $M_c$ in equation 3 is determined by the magnitude of the magnetic field, $B_Z$, and the voltage at the center of the chamber (i.e. along the longitudinal axis), $V_{ctr}$. These two variables are design considerations and can be controlled. It is also important that the filtering conditions (Eqs. 2 and 3) are not dependent on boundary conditions. Specifically, the velocity and location where each particle of a multi-species plasma enters the chamber does not affect the ability of the crossed electric and magnetic fields to eject high-mass particles ($M > M_c$) while confining low-mass particles ($M < M_c$) to orbits which remain within the distance "a" from the axis of rotation.

It happens that in a plasma mass filter, wherein ions are subjected to the conditions disclosed above, those ions which have a mass greater than the cut-off value, $M_c$, will follow unconfined orbits that cause them to be rapidly ejected from the space where ions having a mass less than the cut-off value are confined. Actually, this separation typically occurs in less than one-half of a rotation of a multi-species plasma about its axis of rotation. Due to this quite rapid separation of heavy mass particles from light mass particles, the present invention recognizes that it is not necessary for the multi-species plasma to be moved in translation through the plasma chamber. Instead, the particles can be separated in the plasma according to their mass while being constrained to move primarily in rotation.

In light of the above, it is an object of the present invention to provide an enclosed toroidal plasma mass filter having a partially-cylindrical plasma chamber wherein the source of a multi-species plasma is azimuthally distanced from the collector that is to be used for collecting the light mass ions from the plasma, while the heavy mass ions are ejected into the chamber wall. It is another object of the present invention to provide a toroidal plasma mass filter which is relatively compact and efficiently conserves space. Yet another object of the present invention is to provide a toroidal plasma mass filter wherein the crossed electric and magnetic fields in the plasma chamber act to draw the multi-species plasma from its source into the chamber. Still another object of the present invention is to provide a toroidal plasma mass filter wherein antennae can be located sufficiently near the source of the multi-species plasma to heat electrons at the source. Another object of the present invention is to provide a toroidal plasma mass filter in which the magnetic field is oriented in the plasma chamber so that electrical disturbances at the ion collector are impeded from propagating back upstream to the source in a direction perpendicular to the magnetic field. Another object of the present invention is to provide a toroidal plasma mass filter which is relatively easy to manufacture, functionally simple to operate, and comparatively cost effective.

SUMMARY OF THE PREFERRED EMBODIMENTS

In accordance with the present invention, a toroidal plasma mass filter for use in the remediation of nuclear waste includes a platform which has an annular shaped surface that is bounded by an inner circumference and an outer circumference and which has a substantially circular axis of rotation that is located on the platform approximately midway between the inner and outer circumferences. An arched wall covers the platform and extends from the inner circumference and over the platform to the outer circumference to create a plasma chamber between the platform and the wall. For purposes of the present invention, the wall of the chamber is located at least at a distance "a" from the axis of rotation.

There is at least one plasma source for the mass filter of the present invention and it is mounted on the platform, in the chamber, between the circular axis of rotation and the wall. This plasma source, and any other similar plasma sources that might also be used, generate a multi-species plasma from the nuclear waste that is to be remediated. Because this nuclear waste will include benign materials, as well as toxic radionuclides, the multi-species plasma that is generated by the plasma source(s) will contain relatively light mass particles ($M^1$) from the benign materials, and relatively heavy mass particles ($M_2$) from the radionuclides. Also mounted on the platform in the chamber is a collector. More specifically, the collector is mounted on the platform opposite the axis of rotation from the plasma source(s). Further, the collector is located at an azimuthal angle, $\beta$, from the plasma source. Accordingly, when the platform is substantially flat, the azimuthal angle will be equal to ninety degrees ($\beta = 90°$).

A helical configured magnetic field, B, is created inside the chamber of the mass filter of the present invention by the combined action of a central coil and a plurality of radial magnetic coils. Specifically, the plurality of radial magnetic coils are each centered around the circular axis of rotation that is located on the platform, and the radial magnetic coils are individually oriented in respective planes which are substantially perpendicular to the circular axis of rotation. Further, each of these radial magnetic coils is distanced from an adjacent radial magnetic coil by an arc distance, $\theta$, which is measured around a central axis that is substantially perpendicular to the plane of the axis of rotation. Unlike the radial magnetic coils, the central coil is mounted directly on the platform and is substantially coincident with the circular axis of rotation.

In addition to the magnetic field, B, an electrical field, $E_r$, is also generated inside the chamber. For the present invention, this electric field, $E_r$, is oriented substantially perpendicular to the axis of rotation and is effectively crossed with the magnetic field, B, to rotate the multi-species plasma around the axis of rotation. More specifically, the electric field, $E_r$, is generated by a plurality of voltage control rings which are mounted on the platform so as to be substantially parallel to and concentric with the central magnetic coil. Further, the voltage control rings are activated so that the electric field, $E_r$ has positive potential on the axis of rotation, $V_{ctr}$, and a substantially zero potential at the wall of the chamber.

In the operation of the present invention, the helical configuration of the magnetic field, B, causes there to be a toroidal component, $B_\phi$, which is oriented substantially parallel to the axis of rotation, and a poloidal component, $B_\theta$, which is perpendicular to $B_\phi$. These components vary significantly in magnitude ($B_\phi >> B_\theta$) and they serve different purposes. Specifically, due to the poloidal component, $B_\theta$, loose electrons in the chamber are not inhibited from rotating around the central axis of rotation. Instead, $B_\theta$ allows the electrons to exit the plasma volume to the chamber wall along the magnetic field and thereby prevent an undesirable charge build-up in the chamber. On the other hand, the toroidal component, $B_\phi$, contributes to the rotation of the multi-species plasma around the axis of rotation.

For the present invention, when $B_{100}$, $E_r$, $V_{ctr}$ and the distance "a" satisfy the expression $M_c = ea^2 B_\phi^2 / 8 V_{ctr}$, ("e" is the electric charge of a particle) the light mass particles ($M_1$) in the multi-species plasma will be separated from the heavy mass particles ($M_2$) at the distance "a" from the axis of rotation. Thus, when $M_c$ is selected as a cut-off mass that is greater than $M_1$ and less than $M_2$ ($M_1 < M_c < M_2$) the heavy mass particles will impact with the wall of the chamber and can be subsequently collected from the wall. The light mass particles, however, will not impact the wall in the chamber and, instead, will fall into the collector on the platform of the chamber.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which:

FIG. 3A is a schematic representation of the magnetic field, B, and the electric field, $E_r$, inside the chamber of the plasma mass filter, as seen in a top plan view;

FIG. 3B is a schematic representation of the magnetic field, B, and the electric field, $E_r$, inside the chamber of the plasma mass filter, as seen in an elevational view; and FIG. 4 is a cross sectional view of the toroidal plasma mass filter of the present invention as seen along the line 4—4 in FIG. 1.

DESCRIPTION OF THE PREFERRED EMBODIMENT

Figure 1:
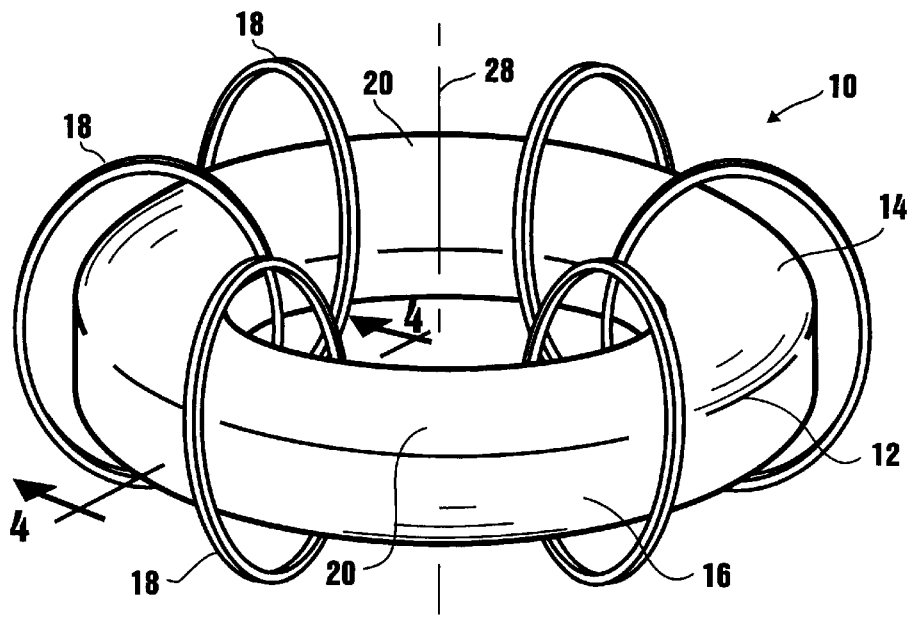
FIG. 1 is a perspective view of the toroidal plasma mass filter of the present invention.

Referring initially to FIG. 1, a toroidal plasma mass filter in accordance with the present invention is shown and is generally designated 10. As seen from its exterior in FIG. 1, the toroidal plasma mass filter 10 includes a housing 12 which comprises a plasma chamber 14 and a base member 16. Also, there are a plurality of radial magnetic coils 18 which encircle the housing 12 substantially as shown.

Figure 2:
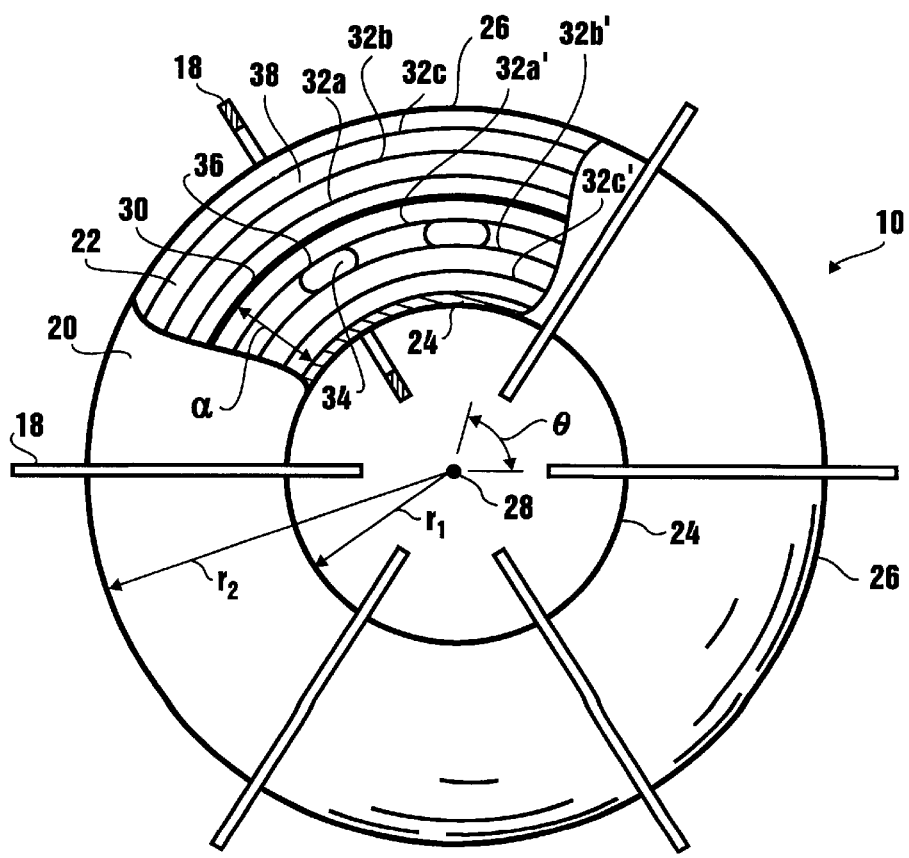
FIG. 2 is a top plan view of the toroidal plasma mass filter of the present invention with portions broken away for clarity.

By cross referencing FIG. 1, FIG. 2, and FIG. 3B it will be appreciated that the plasma chamber 14 is enclosed by an arched wall 20 which is located above a platform 22. As shown in FIG. 2, the platform 22 is annular shaped and is defined by an inner circumference 24 and an outer circumference 26. Preferably, the platform 22 is substantially flat and, therefore, lies in a plane that is substantially perpendicular to a central axis 28. For reference purposes, the platform 22 is centered on the central axis 28 with the inner circumference 24 at a radial distance $r_1$ from the central axis 28, and the outer circumference 26 at a radial distance $r_2$ from the central axis 28.

Still referring to FIG. 2 it will be seen that a central magnetic coil 30 is mounted on the platform 22 and is located approximately midway between the inner circumference 24 and the outer circumference 26. Importantly, the central magnetic coil 30 is substantially coincident with the axis of plasma rotation in the chamber 14 and, thus, is everywhere at least at a distance "a" from the arched wall 20. Additionally, between the central magnetic coil 30 and the outer circumference 26 there are a plurality of voltage control rings 32, of which the voltage control rings 32a, 32b and 32c are exemplary. Similarly, between the central magnetic coil 30 and the inner circumference 24 there are a plurality of voltage control rings 32a', 32b' and 32c'. For the purposes of the present invention, all of these voltage control rings 32a–c and 32a'–c' are mounted on the platform 22 and they are all substantially concentric with the central axis 28.

Also mounted on the platform 22 in the plasma chamber 14 is at least one plasma source 34. Although the plasma source 34 shown in FIG. 2 is located between the central magnetic coil 30 and the inner circumference 24, it will be appreciated that with other appropriate modifications of parameters for the filter 10, the plasma source 34 could just as well be mounted between the central magnetic coil 30 and the outer circumference 26. In either case, an rf antenna 36 can be positioned around the plasma source 34 to heat electrons at the source 34. A collector 38 is also provided on the platform 22, and is located opposite the central magnetic coil (axis of rotation) 30 from the plasma source 34.

For the toroidal plasma mass filter 10 of the present invention, a helical configured magnetic field, B, is generated in the plasma chamber 14. This is accomplished by simultaneously activating the plurality of radial magnetic coils 18 and the central magnetic coil 30. The result is a magnetic field whose configuration in the chamber is perhaps best appreciated with reference to FIG. 3A and FIG. 3B. By cross referencing FIG. 3A with FIG. 3B, it will be appreciated that the magnetic field, B, has a toroidal component $B_\phi$ which is generally parallel to the central magnetic coil (axis of rotation) 30 and which is, therefore, directed around the plasma chamber 16. Additionally, the magnetic field, B, has a poloidal component $B_\theta$ which is generally perpendicular to the toroidal component $B_\phi$. The result is a helical configuration for the magnetic field B which is schematically shown in FIG. 3A.

In addition to the magnetic field B, an electric field, $E_r$, is also established in the plasma chamber 14. Specifically, the electric field, $E_r$, is generated by the plurality of voltage control rings 32 that are located on the platform 22 in plasma chamber 14. It is an important aspect of the present invention that a positive potential be established at the axis of rotation (central magnetic coil) 30 and that a substantially zero potential be established at the wall 20. Thus, for example, the voltage potential on voltage control rings 32a and 32a' might be set at eight hundred volts, while the voltage potential on voltage control rings 32b and 32b' might be set at five hundred volts, and the voltage potential on voltage control rings 32c and 32c' might be two hundred volts. The point is that the voltage potentials on the various voltage control rings 32 can be set to establish a positive potential $V_{ctr}$ along the axis or rotation (central magnetic coil) 30 with a determined gradient from $V_{ctr}$ to a substantially zero potential at the wall 20.

When considering the magnetic field, B, together with the electric field, $E_r$, in the plasma chamber 16, it will be appreciated that the toroidal component $B_\phi$ will cross with the electric field $E_r$ to cause a rotation of charged particles around the axis or rotation (central magnetic coil) 30. These charged particles are, of course, ions and they have sufficient mass for them to be moved in a direction that is substantially perpendicular to the magnetic field lines of B. On the other hand, the excess electrons which result when the ions move radially can move along the magnetic field lines to the wall, thus avoiding charge buildup.

In the operation of the toroidal plasma mass filter 10 of the present invention, a suitable vacuum is first drawn in the plasma chamber 14, and the magnetic field, B, and electric field, $E_r$, as disclosed above are established. Specifically, for a plasma chamber 14 having a distance "a" between the axis of rotation (central magnetic coil) 30 and the wall 20, values for $B_\phi$, $E_r$ and $V_{ctr}$ are established. A multi-species plasma is then generated by plasma source 34 which will contain both light mass particles ($M_1$) 40, and heavy mass particles ($M_2$) 42 (see FIG. 4). Due to the crossed magnetic and electric fields, and in accordance with well known physical principles, the particles 40 and 42 will be forced to rotate around the axis of rotation (central magnetic coil) 30. In accordance with the expression $M_c = ea^2 B_\phi^2 / 8 V_{ctr}$, where "e" is the electric charge of a particle and $M_c$ is selected as a cut-off mass greater than $M_1$ and less than $M_2$ ($M_1 < M_c < M_2$), the light mass particles ($M_1$) 40 will rotate in their respective orbits about the axis or rotation 30 while being confined within the distance "a" from the axis of rotation 30. Consequently, the light mass particles ($M_1$) 40 will be collected in the collector 38. On the other hand, the heavy mass particles ($M_2$) 42 will not be so confined and will impact with the wall 20. The heavy mass particles ($M_2$) 42 can then be collected from the wall 20.

While the particular Toroidal Plasma Mass Filter as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A toroidal plasma mass filter which comprises:
   a platform having an annular shaped surface bounded by an inner circumference and an outer circumference, said platform defining a substantially circular axis of rotation located substantially midway between said inner circumference and said outer circumference;
   a chamber bounded by said platform and an arched wall covering said platform, said wall extending from said inner circumference to said outer circumference and being at least at a distance "a" from said axis of rotation;
   at least one plasma source mounted in said chamber on said platform between said axis of rotation and said wall for generating a multi-species plasma containing light mass particles ($M_1$) and heavy mass particles ($M_2$);
   a means for generating a magnetic field, B, having a substantially helical configuration around said axis of rotation in said chamber; and
   a means for generating an electrical field, $E_r$, in said chamber, said electric field having a positive potential at said axis of rotation and a substantially zero potential on said wall, said electric field being oriented substantially perpendicular to the axis of rotation and crossed with said magnetic field to rotate said multi-species plasma around the axis of rotation to separate the light mass particles ($M_1$) from the heavy mass particles ($M_2$).

2. A plasma filter as recited in claim 1 further comprising a collector mounted in said chamber on said platform between the axis of rotation and said wall, and located at an azimuthal angle, $\beta$, from said plasma source.

3. A plasma filter as recited in claim 2 wherein said platform is substantially flat and said azimuthal angle is equal to ninety degrees ($\beta = 90°$).

4. A plasma filter as recited in claim 1 wherein the inner circumference is defined by a first radius, $r_1$, and the outer circumference is defined by a second radius, $r_2$, and wherein the second radius is greater than the first radius ($r_2 > r_1$).

5. A plasma filter as recited in claim 1 wherein the circular axis of rotation in said chamber is centered on a central axis substantially perpendicular to the plane of the axis of rotation, and wherein said magnetic means for generating said magnetic field, B, comprises:
   a plurality of radial magnetic coils, each said radial magnetic coil being centered on the axis of rotation and oriented in a plane substantially perpendicular thereto with each said magnetic coil being distanced from an adjacent magnetic coil by an arc distance, $\phi$, measured around the central axis; and
   a central coil mounted on said platform coincident with the axis of rotation.

6. A plasma filter as recited in claim 5 wherein said electric field, $E_r$, is generated by a plurality of voltage control rings mounted on said platform and centered on the central axis, with said electric field having a positive potential on the axis of rotation, $V_{ctr}$, and a substantially zero potential at said wall of said chamber.

7. A plasma filter as recited in claim 6 wherein B has a toroidal component, $B_\phi$, and a poloidal component, $B_\theta$, and wherein $B_\phi$, $E_r$, $V_{ctr}$ and the distance "a" satisfy the expression $M_c = ea^2 B_\phi^2 / 8 V_{ctr}$, where "e" is the electric charge of a particle and $M_c$ is selected as a cut-off mass greater than $M_1$ and less than $M_2$ ($M_1 < M_c < M_2$).

8. A plasma filter which comprises:
   a plasma source for generating a multi-species plasma containing light mass particles ($M_1$) and heavy mass particles ($M_2$);
   a means for generating a magnetic field, B, having a substantially helical configuration around a substantially circular axis of rotation;
   a means for generating an electrical field, $E_r$, said electric field having a positive potential at said axis of rotation and a substantially zero potential on said wall, and oriented substantially perpendicular to the axis of rotation and crossed with said magnetic field, B, to rotate said multi-species plasma around the axis of rotation to separate the light mass particles ($M_1$) from the heavy mass particles ($M_2$);

a means for injecting the multi-species plasma into said crossed magnetic and electric fields to interact therewith for ejecting the heavy mass particles away from said axis of rotation and for confining the light mass particles within a distance "a" from said axis during transit therein;

a radial collector oriented substantially perpendicular to the axis of rotation and extending through a distance "a" therefrom for collecting light mass particles ($M_1$); and a circumferential collector located at least at the distance "a" from the axis of rotation for collecting heavy mass particles ($M_2$).

9. A plasma filter as recited in claim 8 further comprising a substantially annular shaped chamber established between an arched wall and a platform, the circular axis of rotation being located on the platform and defining a plane, the circular axis of rotation also being at least at the distance "a" from said wall, said chamber being centered on a central axis with the central axis being substantially perpendicular to the plane of the axis of rotation.

10. A plasma filter as recited in claim 9 wherein said plasma source is mounted in said chamber on said platform between the axis of rotation and said wall.

11. A plasma filter as recited in claim 10 further comprising a collector mounted in said chamber on said platform between the axis of rotation and said wall, and located at an azimuthal angle, $\beta$, from said plasma source.

12. A plasma filter as recited in claim 11 wherein said platform is substantially flat and said azimuthal angle is equal to ninety degrees ($\beta=90°$).

13. A plasma filter as recited in claim 12 wherein said magnetic means for generating said magnetic field, B, comprises:

a plurality of radial magnetic coils, each said radial magnetic coil being centered on the axis of rotation and oriented in a plane substantially perpendicular thereto with each said magnetic coil being distanced from an adjacent magnetic coil by an arc distance, $\phi$, measured around the central axis; and a central coil mounted on said platform coincident with the axis of rotation.

14. A plasma filter as recited in claim 13 wherein said electric field, $E_r$, is generated by a plurality of voltage control rings mounted on said platform and centered on the central axis, with said electric field having a positive potential on the axis of rotation, $V_{ctr}$, and a substantially zero potential at said wall of said chamber.

15. A plasma filter as recited in claim 14 wherein B has a toroidal component, $B_\phi$, and a poloidal component, $B_\theta$, and wherein $B_\phi$, $E_r$, $V_{ctr}$ and the distance "a" satisfy the expression $M_c = ea^2 B_\phi^2 / 8 V_{ctr}$, where "e" is the electric charge of a particle and $M_c$ is selected as a cut-off mass greater than $M_1$ and less than $M_2$ ($M_1 < M_c < M_2$).

16. A plasma filter which comprises:

a substantially annular shaped chamber established between an arched wall and a platform, said platform defining a circular axis of rotation thereon with the axis of rotation defining a plane and being at least at a distance "a" from said wall, said chamber being centered on a central axis with the central axis being substantially perpendicular to the plane of the axis of rotation;

at least one plasma source mounted in said chamber on said platform between said axis of rotation and said wall for generating a multi-species containing light mass particles ($M_1$) and heavy mass particles ($M_2$);

a means for generating a magnetic field, B, having a substantially helical configuration around said axis of rotation in said chamber; and a means for generating an electrical field, $E_r$, in said chamber, said electric field having a positive potential at said axis of rotation and a substantially zero potential on said wall, with said electric field being oriented substantially perpendicular to the axis of rotation and crossed with said magnetic field to rotate said multi-species plasma around the axis of rotation to separate the light mass particles ($M_1$) from the heavy mass particles ($M_2$).

17. A plasma filter as recited in claim 16 further comprising a collector mounted in said chamber on said platform between the axis of rotation and said wall, and located at an azimuthal angle, $\beta$, from said plasma source.

18. A plasma filter as recited in claim 17 wherein said platform is substantially flat and said azimuthal angle is equal to ninety degrees ($\beta=90°$).

19. A plasma filter as recited in claim 18 wherein said magnetic means for generating said magnetic field, B, comprises a plurality of radial magnetic coils, each said radial magnetic coil being centered on the axis of rotation and oriented in a plane substantially perpendicular thereto with each said magnetic coil being distanced from an adjacent magnetic coil by an arc distance, $\phi$, measured around the central axis and a central coil mounted on said platform coincident with the axis of rotation; and further wherein said electric field, $E_r$, is generated by a plurality of voltage control rings mounted on said platform and centered on the central axis, with said electric field having a positive potential on the axis of rotation, $V_{ctr}$, and a substantially zero potential at said wall of said chamber.

20. A plasma filter as recited in claim 19 wherein B has a toroidal component, $B_\phi$, and a poloidal component, $B_\theta$, and wherein $B_\phi$, $E_r$, $V_{ctr}$ and the distance "a" satisfy the expression $M_c = ea^2 B_\phi^2 / 8 V_{ctr}$, where "e" is the electric charge of a particle and $M_c$ is selected as a cut-off mass greater than $M_1$ and less than $M_2$ ($M_1 < M_c < M_2$).

* * * * *

UNITED STATES PATENT AND TRADEMARK OFFICE
CERTIFICATE OF CORRECTION

PATENT NO. : 6,214,223 B1
DATED : April 10, 2001
INVENTOR(S) : Ohkawa

It is certified that error appears in the above-identified patent and that said Letters Patent is hereby corrected as shown below:

Column 2,
Line 50, delete [(2M)+($P_\theta \Omega$/] insert -- (2M)+($P_\theta \Omega$/ --

Column 3,
Line 20, delete [centralvoltage ] insert -- central voltage --

Column 4,
Line 43, delete [($M^1$)] insert -- ($M_1$) --

Column 5,
Line 26, delete [$B_{100}$,] insert -- $B_\Phi$ --

Signed and Sealed this

Thirteenth day of November, 2001

*Attest:*

NICHOLAS P. GODICI
*Attesting Officer*  *Acting Director of the United States Patent and Trademark Office*

UNITED STATES PATENT AND TRADEMARK OFFICE
CERTIFICATE OF CORRECTION

PATENT NO. : 6,214,223 B1
DATED : April 10, 2001
INVENTOR(S) : Ohkawa

Page 1 of 1

It is certified that error appears in the above-identified patent and that said Letters Patent is hereby corrected as shown below:

Column 2,
Line 50, delete [(2M)+($P_\theta\Omega$/] insert -- (2M)+($P_\theta\Omega$/ --

Column 3,
Line 20, delete [centralvoltage] insert -- central voltage --

Column 4,
Line 43, delete [($M^1$)] insert -- ($M_1$) --

Column 5,
Line ($B_{100}$,] insert -- $B_\Phi$ --

Signed and Sealed this

Twenty-seventh day of November, 2001

Attest:

NICHOLAS P. GODICI
Attesting Officer
Acting Director of the United States Patent and Trademark Office